United States Patent
Kim

(10) Patent No.: US 8,872,817 B2
(45) Date of Patent: Oct. 28, 2014

(54) REAL-TIME THREE-DIMENSIONAL REAL ENVIRONMENT RECONSTRUCTION APPARATUS AND METHOD

(75) Inventor: Young-Hee Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 180 days.

(21) Appl. No.: 13/549,233

(22) Filed: Jul. 13, 2012

(65) Prior Publication Data

US 2013/0147789 A1    Jun. 13, 2013

(30) Foreign Application Priority Data

Dec. 8, 2011  (KR) .................. 10-2011-0131246

(51) Int. Cl.
  *G06T 15/00* (2011.01)
  *G09G 5/00* (2006.01)
  *H04N 13/02* (2006.01)

(52) U.S. Cl.
  USPC ............................ 345/419; 345/679; 348/47

(58) Field of Classification Search
  CPC  G06T 19/00; G06T 3/04815; H04N 13/0239; H04N 13/0242
  USPC ................ 345/419, 679; 348/47, 48
  See application file for complete search history.

(56) References Cited

U.S. PATENT DOCUMENTS

| 2005/0052464 A1* | 3/2005 | Okuyama ..................... 345/582 |
| 2005/0271302 A1* | 12/2005 | Khamene et al. ............ 382/294 |
| 2008/0030510 A1* | 2/2008 | Wan et al. ..................... 345/505 |
| 2011/0115886 A1* | 5/2011 | Nguyen et al. ................ 348/47 |
| 2012/0194516 A1* | 8/2012 | Newcombe et al. .......... 345/420 |

FOREIGN PATENT DOCUMENTS

KR    10-1126626    3/2012

OTHER PUBLICATIONS

Peter Henry et al., "RGB-D Mapping: Using Depth Cameras for Dense 3D Modeling of Indoor Environments", Proc. of International Symposium on Experimental Robotics (ISER), 2010, pp. 1-15.
Nikolas Engelhard et al., "Real-time 3D visual SLAM with a hand-held RGB-D camera", RGB-D Workshop on 3D Perception in Robotics, Apr. 8, 2011, Västerås, Sweden.

* cited by examiner

*Primary Examiner* — Joni Richer
*Assistant Examiner* — Yi Yang

(57) ABSTRACT

A real-time three-dimensional (3D) real environment reconstruction apparatus and method are provided. The real-time 3D real environment reconstruction apparatus reconstructs a 3D real environment in real-time, or processes data input through RGB-D cameras in real-time using a plurality of GPUs so as to reconstruct a wide ranging 3D real environment.

12 Claims, 5 Drawing Sheets

REAL-TIME THREE-DIMENSIONAL REAL ENVIRONMENT RECONSTRUCTION APPARATUS AND METHOD

CROSS-REFERENCE TO RELATED APPLICATION

This application claims the benefit under 35 U.S.C. §119 (a) of Korean Patent Application No. 10-2011-0131246, filed on Dec. 8, 2011, the entire disclosure of which is incorporated herein by reference for all purposes.

BACKGROUND

1. Field

The following description relates to computer graphics technology, and more particularly, to technology for three-dimensionally reconstructing a real environment using an RGB-D camera.

2. Description of the Related Art

The problem of reconstructing a three-dimensional (3D) actual space still remains a challenging problem in computer graphics. To solve this problem, attempts have been made to reconstruct 3D actual space using a large number of pictures or camera images. In recent years, research is focusing on reconstructing 3D real environments using a camera capable of measuring depth as well as obtaining color images.

In the conventional art, Korean Patent No. 10-2011-0099431 discloses a method of three-dimensionally reconstructing a moving path of a system and a peripheral environment by combining data obtained from a laser sensor and a camera.

SUMMARY

The following description relates to a real-time three-dimensional (3D) real environment reconstruction apparatus and method for reconstructing a 3D real environment in real time using an RGB-D camera.

In one general aspect, there is provided a real-time three-dimensional (3D) real environment reconstruction apparatus, including: a plurality of RGB-D cameras that acquire frame information including RGB color image information and depth image information; and a processor that includes a plurality of GPUs for processing the frame information acquired by the plurality of RGB-D cameras and a CPU for aligning a processing result of each of the GPUs, and reconstructs a 3D real environment in real-time, wherein the RGB-D cameras the GPUs are configured as sets including one RGB-D camera and one GPU.

In another general aspect, there is provided a real-time 3D real environment reconstruction apparatus, including: an RGB-D camera that acquires frame information including RGB color image information and depth image information; and a processor that includes a plurality of GPUs for processing the frame information and a CPU for sequentially transmitting is frame information input from the RGB-D camera to each of the GPUs over time and matching a processing result of each of the GPUs, and reconstructs a 3D real environment in real time.

In still another general aspect, there is provided a real-time 3D real environment reconstruction method performed by a GPU, including: receiving, from a CPU, frame information input through each RGB-D camera in a plurality of sets including one RGB-D camera and one GPU, extracting feature point information from frame information of a present view point and frame information of a previous view point, extracting matching points of feature points, and transmitting the extracted feature point information to the CPU; and generating local 3D coordinates of each of the matching points extracted from the present view point and the previous view point, and transmitting the generated local 3D coordinates to the CPU to convert the local 3D coordinates into global 3D coordinates.

In yet another general aspect, there is provided a real-time 3D real environment reconstruction method performed by a CPU, including: transmitting frame information input from an RGB-D camera to a GPU in each of a plurality of sets including one RGB-D camera and one GPU; collecting local 3D coordinates and feature point information from each of the GPUs in accordance with a frame information transmission result; and generating global 3D coordinates by matching the local 3D coordinates using correction information of each of the RGB-D cameras and the feature point information.

Other features and aspects will be apparent from the following detailed description, the drawings, and the claims.

Figure 1:
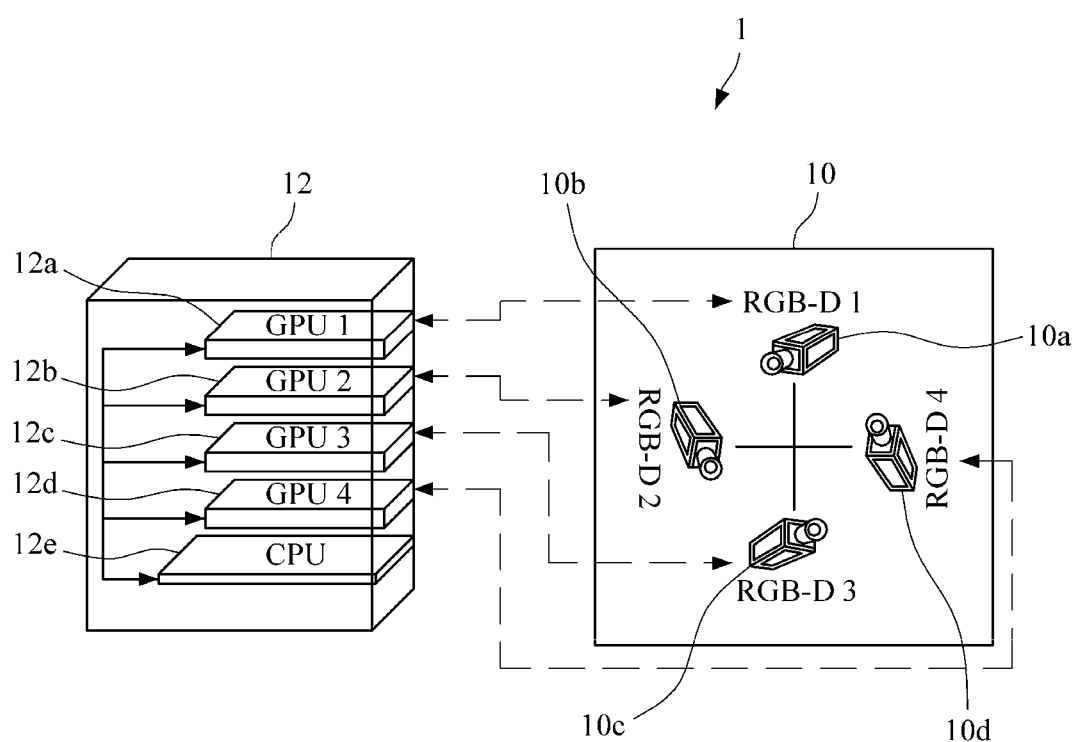
FIG. 1 is a configuration diagram illustrating a real-time three-dimensional (3D) real environment reconstruction apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, preferred embodiments of the present invention will be described in detail with reference to accompanying drawings.

FIG. 1 is a configuration diagram illustrating a real-time three-dimensional (3D) real environment reconstruction apparatus 1 according to an embodiment of the present invention.

The real-time 3D real environment reconstruction apparatus 1 includes a scan device 10 including a plurality of RGB-D cameras 10a, 10b, 10c, and 10d, and a processor 12 including a plurality of graphics processing units (GPUs) 12a, 12b, 12c, and 12d and a single CPU 12e.

According to an embodiment, a three-dimensional real environment is reconstructed in real-time using the plurality of RGB-D cameras 10a, 10b, 10c, and 10d and the plurality of GPUs 12a, 12b, 12c, and 12d. That is, 3D real environment reconstruction is performed in real-time, or the plurality of RGB-D cameras 10a, 10b, 10c, and 10d are simultaneously used in parallel so as to reconstruct a wide ranging 3D real environment, and data input through the plurality of RGB-D cameras is processed in real-time using the plurality of GPUs 12a, 12b, 12c, and 12d.

Each of the RGB-D cameras simultaneously receives color image information and depth image information so as to reconstruct a 3D actual space in real-time to thereby give users a feeling of immersion.

For example, as shown in FIG. 1, an RGB-D camera 1 (10a) and a GPU 1 (12a) are a set, an RGB-D camera 2 (10b) and a GPU 2 (12b) are a set, an RGB-D camera 3 (10c) and a GPU 3 (12c) are a set, and an RGB-D camera 4 (10d) and a GPU 4 (12d) are a set.

Referring to FIG. 1, the scan device 10 simultaneously receives data in four directions by connecting the four RGB-D cameras 10a, 10b, 10c, and 10d.

The four GPUs 12a, 12b, 12c, and 12d process the data input through each of the RGB-D cameras 10a, 10b, 10c, and 10d.

The CPU 12e performs overall data management and connection between the GPUs 12a, 12b, 12c, and 12d.

Hereinafter, a combination of one RGB-D camera and one GPU is referred to as a "device set".

In FIG. 1, a number of the RGB-D cameras and a number of the GPUs are each limited to "4", such as the four RGB-D cameras 10a, 10b, 10c, and 10d and the four GPUs 12a, 12b, 12c, and 12d, but may be expanded to N-number as long as the RGB-D cameras and the GPUs are is paired with one another to form device sets.

In each device set, the GPU receives, from the CPU, frame information input from the RGB-D camera.

The GPU generates local 3D point cloud information of each view point using transmitted frame information of a present view point (t) and transmitted frame information of a previous view point (t−1).

The frame information includes RGB color image information and depth image information.

The local 3D point cloud information includes 3D local coordinates, a color value, and a normal value.

Local 3D point cloud coordinates may be referred to as local coordinates.

The GPU transmits the local point cloud information to the CPU. This is to align each local 3D point cloud coordinates with global coordinates by the CPU.

Thereafter, when new frame information is acquired, the frame information of the present view point is changed to the frame information of the previous view point and the above-described process is repeatedly performed.

The real-time 3D real environment reconstruction apparatus 1 including the plurality of RGB-D cameras and the plurality of GPUs is implemented in a distributed computing environment having a master-work structure. In this case, the GPU acts as a worker node, and the CPU acts as a master node.

Functions of the CPU master node are as follows.

First, the CPU transmits color image information and the depth image information input from the RGB-D camera to the GPU in each device set.

Second, the CPU collects reconstructed local 3D point cloud information from each of the GPUs.

Third, the CPU collects feature point information extracted from each of the GPUs.

Fourth, the CPU aligns the local 3D point cloud information received from each of the GPUs using correction information of each of the RGB-D cameras and the feature point information.

Fifth, the CPU deals with a loop closure problem.

Loop closure is necessary to compensate for a phenomenon in which accumulated error in camera position tracking results in mismatch between a start position and an end position in a camera position tracking loop.

Figure 2:
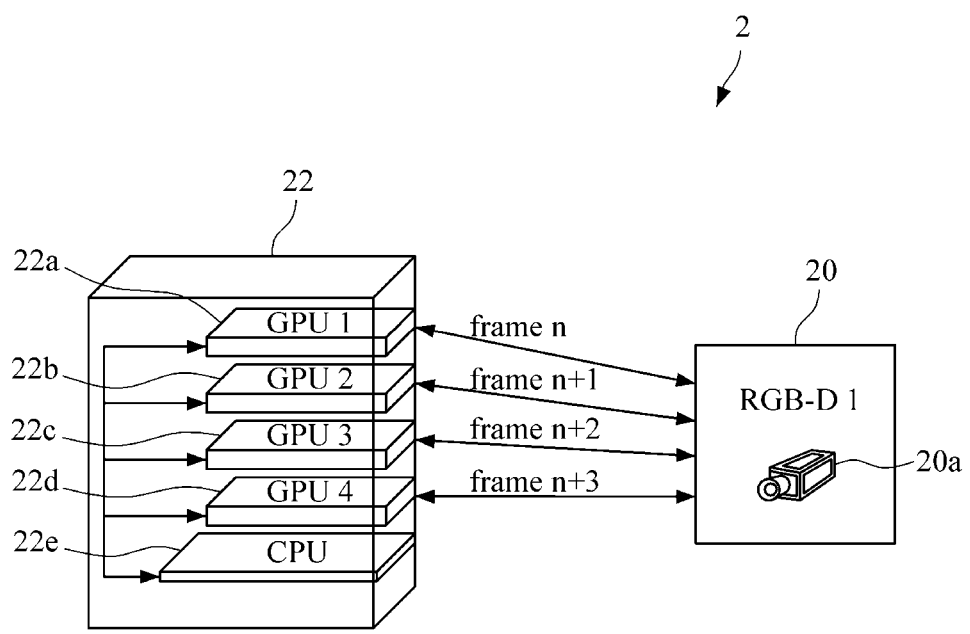
FIG. 2 is a configuration diagram illustrating a real-time 3D real environment is reconstruction apparatus according to another embodiment of the present invention.

FIG. 2 is a configuration diagram illustrating a real-time 3D real environment reconstruction apparatus 2 according to another embodiment of the present invention.

The real-time 3D real environment reconstruction apparatus 2 includes a scan device 20 including one RGB-D camera 20a, and a processor 22 including a plurality of GPUs 22a, 22b, 22c, and 22d, and one CPU 22e.

According to an embodiment, the real-time 3D real environment reconstruction apparatus 2 reconstructs a 3D real environment in real-time using the one RGB-D camera 20a and the plurality of GPUs 22a, 22b, 22c, and 22d.

That is, the real-time 3D real environment reconstruction apparatus 2 processes data input through the one RGB-D camera 20a in real-time using the plurality of GPUs 22a, 22b, 22c, and 22d so as to perform reconstruction of the 3D real environment in real-time or to reconstruct a wide ranging 3D real environment.

The RGB-D camera 20a receives color image information and depth image information so as to reconstruct a 3D actual space in real-time to thereby give users a feeling of immersion.

Each of the GPUs 22a, 22b, 22c, and 22d sequentially receives frame information input from the RGB-D camera 20a.

For example, as shown in FIG. 2, a GPU 1 (22a) receives frame information of an n-th view point, a GPU 2 (22b) receives frame information of an (n+1)-th view point, a GPU 3 (22c) receives frame information of an (n+2)-th view point, and a GPU 4 (22d) receives frame information of an (n+3)-th view point, through the CPU 22e, from the RGB-D camera 20a.

Accordingly, an amount of data to be processed by one GPU is reduced to 1/n (n is the number of GPUs), so that an n-fold increase in processing speed may be expected.

However, since one GPU performs a 3D reconstruction process using data sampled by 1/n, an error may occur when there is a dramatic or sudden change in the input data. However, an error occurring when the RGB-D camera 20a generates data at a predetermined rate (for example, 30 frame/sec) or more corresponds to an acceptable range and does not greatly matter.

Referring to FIG. 2, the scan device 20 receives data through one RGB-D camera 20a.

The four GPUs 22a, 22b, 22c, and 22d sequentially process the data input through the RGB-D camera 20a.

Next, the CPU 12e performs overall data management and connection between the GPUs 22a, 22b, 22c, and 22d.

In FIG. 2, a number of the GPUs is limited to "4", such as the four GPUs 22a, 22b, 22c, and 22d, but the number GPUs may be expanded to N-number.

Each of the GPUs 22a, 22b, 22c, and 22d sequentially receives, from the CPU 22e, the frame information input from the RGB-D camera 20a.

Next, each of the GPUs 22a, 22b, 22c, and 22d generates local 3D point cloud information of a corresponding view point using the transmitted frame information of a predetermined view point.

The frame information includes RGB color image information and depth image information.

The local 3D point cloud information includes 3D local coordinates, a color value, and a normal value. Local 3D point cloud coordinates are referred to as local coordinates.

Each of the GPUs 22a, 22b, 22c, and 22d transmits the local 3D point cloud information to the CPU 22e. This is to align each local 3D point cloud coordinates with global coordinates by the CPU 22e.

The real-time 3D real environment reconstruction apparatus 2 including the one RGB-D camera and the plurality of GPUs is implemented in a distributed computing environment having a master-work structure. In this case, the GPU acts as a worker node and the CPU acts as a master node.

Functions of the CPU master node are as follows.

First, the CPU sequentially transmits the color image information and the depth image information input from the RGB-D camera to each of the GPUs.

Second, the CPU collects reconstructed local 3D point cloud information from each of the GPUs.

Third, the CPU collects feature point information extracted from each of the GPUs.

Fourth, the CPU aligns the local 3D point cloud information received from each of the GPUs using correction information of the RGB-D cameras and the feature point information.

Fifth, the CPU deals with a loop closure problem.

Hereinafter, a configuration of the GPU 30 and the CPU 40 will be described in detail with reference to FIGS. 3 and 4.

Figure 3:
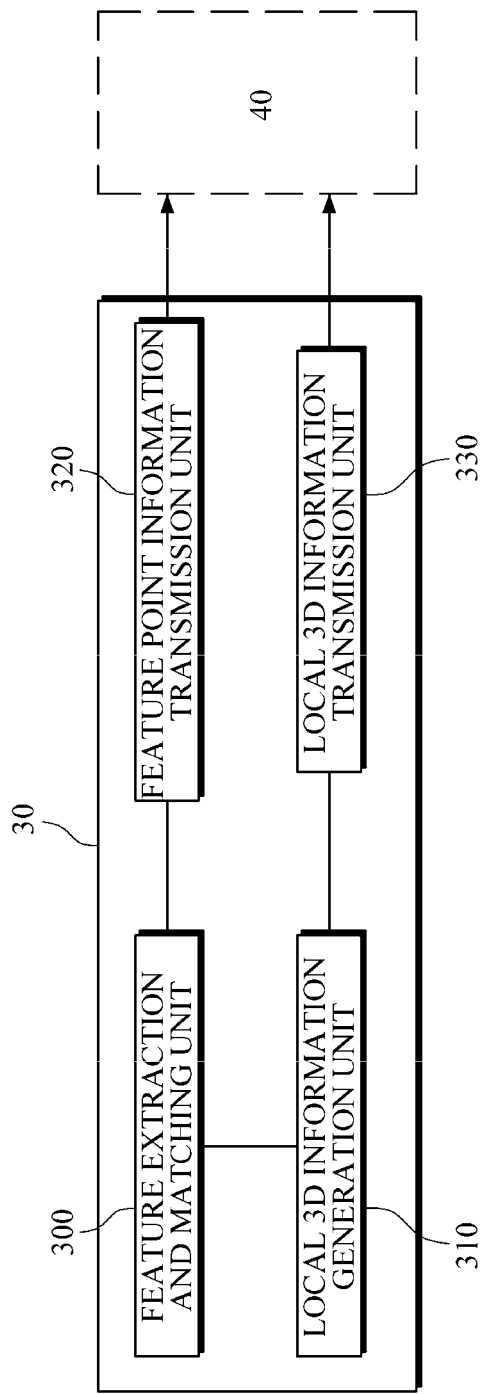
FIG. 3 is a detailed configuration diagram illustrating a GPU according to an embodiment of the present invention.

FIG. 3 is a detailed configuration diagram illustrating the GPU 30 according to an embodiment of the present invention.

The GPU 30 includes a feature extraction and matching unit 300, a local 3D information generation unit 310, a feature point information transmission unit 320, and a local 3D information transmission unit 330.

First, each component of the GPU in the real-time 3D real environment reconstruction apparatus 1 shown in FIG. 1 that includes the scan device including the plurality of RGB-D cameras and the processor including the plurality of GPUs and one CPU will be described below.

In each device set, the feature extraction and matching unit 300 receives, from the CPU 40, frame information input from the RGB-D camera, extracts feature point information from frame information of a present view point and frame information of a previous view point, and extracts matching points of feature points.

The local 3D information generation unit 310 generates local 3D coordinates of each of the matching points extracted from each view point through the feature extraction and matching unit 300.

The local 3D information transmission unit 330 transmits, to the CPU 40, the local 3D coordinates generated by the local 3D information generation unit 310 to convert the local 3D coordinates into global 3D coordinates.

The feature point information transmission unit 320 transmits, to the CPU 40, the feature point information extracted by the feature extraction and matching unit 300.

Next, each component of the GPU in the real-time 3D real environment reconstruction apparatus 2 shown in FIG. 2 that includes the scan device including one RGB-D camera and the processor including the plurality of GPUs and one CPU will be described below.

The feature extraction and matching unit 300 receives, from the CPU 40, frame information input from the RGB-D camera, extracts feature point information from the frame information of a predetermined view point, and extracts matching points of feature points.

The local 3D information generation unit 310 generates local 3D coordinates of each of the matching points extracted from a predetermined view point through the feature extraction and matching unit 300.

The local 3D information transmission unit 330 transmits, to the CPU 40, the local 3D coordinates generated by the local 3D information generation unit 310 to convert the local 3D coordinates into global 3D coordinates.

The feature point information transmission unit 320 transmits, to the CPU 40, the feature point information extracted by the feature extraction and matching unit 300.

Figure 4:
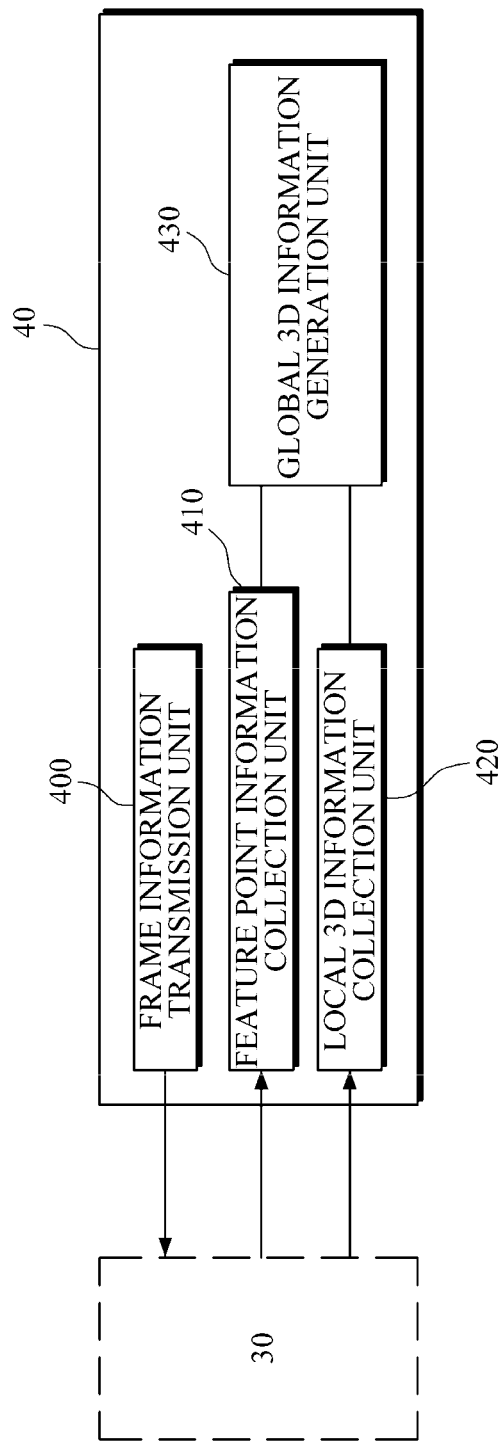
FIG. 4 a detailed configuration diagram illustrating a CPU according to an embodiment of the present invention.

FIG. 4 a detailed configuration diagram illustrating the CPU 40 according to an embodiment of the present invention.

The CPU 40 includes a frame information transmission unit 400, a feature point information collection unit 410, a local 3D information collection unit 420, and a global 3D information generation unit 430.

First, each component of the CPU in the real-time 3D real environment reconstruction apparatus 1 shown in FIG. 1 that includes the scan device including the plurality of RGB-D cameras and the processor including the plurality of GPUs and one CPU will be described below.

In each device set, the frame information transmission unit 400 transmits frame information input from the RGB-D camera to the GPU.

The local 3D information collection unit 420 collects local 3D coordinates from each of the GPUs.

The feature point information collection unit 410 collects feature point information from each of the GPUs.

The global 3D information generation unit 430 generates global 3D coordinates by aligning the local 3D coordinates using correction information of each of the RGB-D cameras and the feature point information.

According to another embodiment, the CPU 40 includes a loop closure processing unit (not shown) that performs a loop closure.

Next, each component of the CPU in the real-time 3D real environment reconstruction apparatus 2 shown in FIG. 2 that includes the scan device including the one RGB-D camera and the processor including the plurality of GPUs and one CPU will be described below.

The frame information transmission unit 400 sequentially transmits, to each of the GPUs, frame information input from the RGB-D camera.

The local 3D information collection unit 420 collects local 3D coordinates from each of the GPUs.

The feature point information collection unit 410 collects feature point information from each of the GPUs.

The global 3D information generation unit 430 generates global 3D coordinates by aligning the local 3D coordinates using correction information of the RGB-D camera and the feature point information.

According to another embodiment, the CPU 40 includes a loop closure processing unit (not shown) that processes a loop closure.

Figure 5:
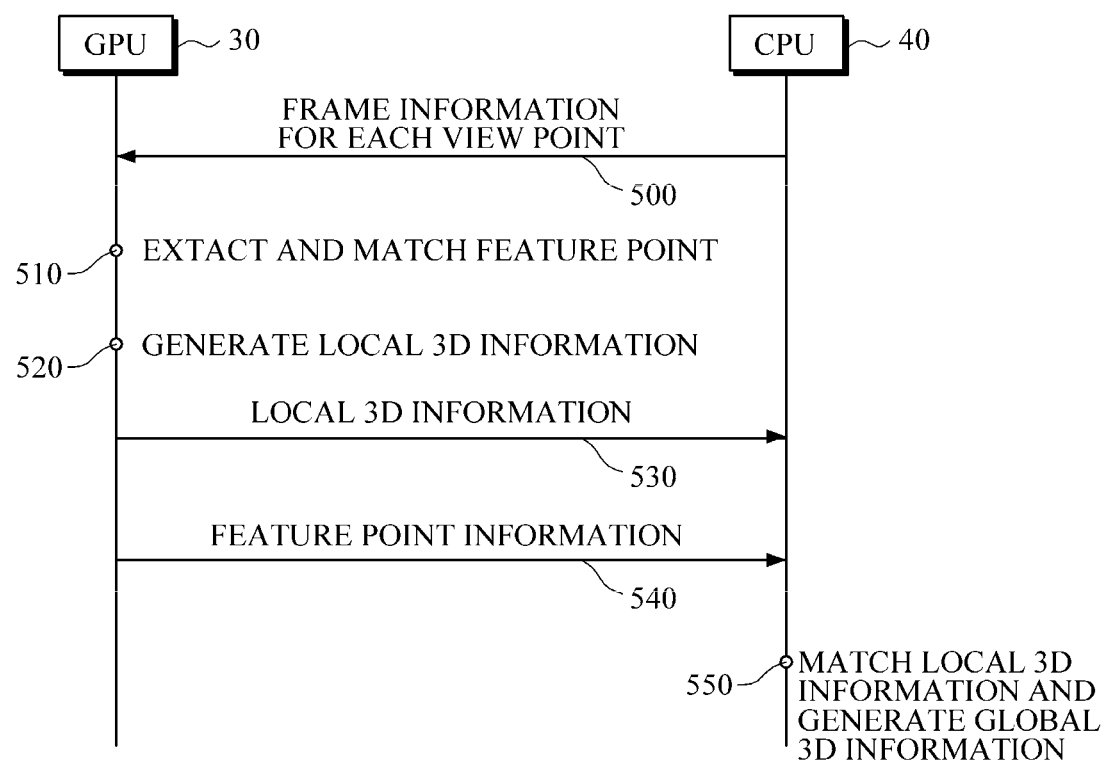
FIG. 5 is a flowchart illustrating a real-time 3D real environment reconstruction method according to an embodiment of the present invention.

FIG. 5 is a flowchart illustrating a real-time 3D real environment reconstruction method according to an embodiment of the present invention.

In operation 500, in order to reconstruct a 3D real environment in real-time, the CPU 40 transmits frame information input from the RGB-D camera to the GPU 30 in each device set.

Next, in operation 510, the GPU 30 extracts feature point information from frame information of a present view point and frame information of a previous view point, and extracts matching points of feature points.

In operation 540, the GPU 30 transmits the extracted feature point information to the CPU 40.

In addition, in operation 520, the GPU 30 generates local 3D coordinates of each of the matching points extracted from the present view point and the previous view point.

In operation 530, the GPU 30 transmits the generated local 3D coordinates to the CPU 40 to convert the local 3D coordinates into global 3D coordinates.

Next, in operation 550, the CPU 40 generates the global 3D coordinates by aligning the local 3D coordinates using correction information of each of the RGB-D cameras and the feature point information.

As described above, according to an embodiment, using the plurality of RGB-D cameras and the plurality of GPUs, a 3D real environment can be rapidly reconstructed in real-time.

Specifically, simultaneously using the plurality of RGB-D cameras and the plurality of GPUs, data input from the plurality of RGB-D cameras is processed in real-time so that the 3D real environment can be rapidly reconstructed and computation-intensive high-precision reconstruction methods can be easily introduced.

In addition, a wide 3D real environment can be readily reconstructed.

According to another embodiment, using one RGB-D camera and the plurality of GPUs, the 3D real environment can be rapidly reconstructed in real-time.

Specifically, data is received through the RGB-D camera, and frame information input from the RGB-D camera is sequentially processed in real-time, over time, so that an amount of data processed by one GPU is reduced to 1/n (n is the number of GPUs). As a result, an n-fold increase in processing speed can be expected.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A real-time three-dimensional (3D) real environment reconstruction apparatus, comprising:
   a plurality of RGB-D cameras that acquire frame information, the frame information including RGB color image information and depth image information; and
   a processor that reconstructs a 3D real environment in real-time and includes:
      a plurality of GPUs that process the frame information acquired by the plurality of RGB-D cameras, wherein each GPU is part of a set that includes one RGB-D camera and one GPU; and
      a CPU that aligns a processing result generated by each of the GPUs.

2. The real-time 3D real environment reconstruction apparatus according to claim 1, wherein each of the GPUs is a worker node and the CPU is a master node.

3. The real-time 3D real environment reconstruction apparatus according to claim 1, wherein each of the GPUs comprises:
   a feature extraction and matching unit that receives, from the CPU, the frame information input from the RGB-D camera that is part of the set that includes the GPU, extracts feature point information from frame information of a present view point and frame information of a previous view point, and extracts matching points of feature points;
   a local 3D information generation unit that generates local 3D coordinates of each of the matching points extracted from each of the view points by the feature extraction and matching unit;
   a local 3D information transmission unit that transmits the local 3D coordinates generated by the local 3D information generation unit to the CPU to convert the local 3D coordinates into global 3D coordinates; and
   a feature point information transmission unit that transmits the feature point information extracted by the feature extraction and matching unit to the CPU.

4. The real-time 3D real environment reconstruction apparatus according to claim 1, wherein the CPU comprises:
   a frame information transmission unit that transmits the frame information input from the RGB-D camera to the GPU in each set;
   a local 3D information collection unit that collects local 3D coordinates from each of the GPUs;
   a feature point information collection unit that collects feature point information from each of the GPUs; and
   a global 3D information generation unit that generates global 3D coordinates by matching the local 3D coordinates using correction information of each of the RGB-D cameras and the feature point information.

5. The real-time 3D real environment reconstruction apparatus according to claim 4, wherein the CPU further comprises:
   a loop closure processing unit that processes a loop closure.

6. A real-time 3D real environment reconstruction apparatus, comprising:
   an RGB-D camera that acquires frame information, the frame information including RGB color image information and depth image information; and
   a processor that reconstructs a 3D real environment in real-time and includes:
      a plurality of GPUs that process the frame information; and
      a CPU that sequentially transmits frame information input from the RGB-D camera to each of the GPUs over time and matches a processing result from each of the GPUs.

7. The real-time 3D real environment reconstruction apparatus according to claim 6, wherein each of the GPUs is a worker node and the CPU is a master node.

8. The real-time 3D real environment reconstruction apparatus according to claim 6, wherein each of the GPUs comprises:
   a feature extraction and matching unit that receives the frame information input from the RGB-D camera from the CPU, extracts feature point information from frame information of a predetermined view point, and extracts matching points of feature points;
   a local 3D information generation unit that generates local 3D coordinates of each of the matching points extracted from the predetermined view point by the feature extraction and matching unit;
   a local 3D information transmission unit that transmits, to the CPU, the local 3D coordinates generated by the local 3D information generation unit to convert the local 3D coordinates into global 3D coordinates; and a feature point information transmission unit that transmits the feature point information extracted by the feature extraction and matching unit to the CPU.

9. The real-time 3D real environment reconstruction apparatus according to claim 6, wherein the CPU comprises:
a frame information transmission unit that sequentially transmits the frame information input from the RGB-D camera to each of the GPUs;
a local 3D information collection unit that collects local 3D coordinates from each of the GPUs;
a feature point information collection unit that collects feature point information from each of the GPUs; and
a global 3D information generation unit that generates global 3D coordinates by matching the local 3D coordinates using correction information of the RGB-D camera and the feature point information.

10. A real-time 3D real environment reconstruction method, the method comprising:
at each GPU of a plurality of GPUs:
receiving frame information from a CPU, the frame information input from a plurality of RGB-D cameras, each RGB-D camera being part of a device set that includes a single RGB-D camera and a single GPU;
extracting feature point information from frame information of a present view point and frame information of a previous view point;
extracting matching points of feature points;
transmitting the extracted feature point information to the CPU;
generating local 3D coordinates of each of the matching points extracted from the present view point and the previous view point; and
transmitting the generated local 3D coordinates to the CPU to convert the local 3D coordinates into global 3D coordinates.

11. The real-time 3D real environment reconstruction method of claim 10, further comprising:
at the CPU:
transmitting the frame information input from the plurality of RGB-D cameras to each GPU of the plurality of GPUs;
collecting local 3D coordinates and feature point information from GPU of the plurality of GPUs in accordance with a frame information transmission result; and
generating global 3D coordinates by matching the local 3D coordinates using correction information for each of the RGB-D cameras and the feature point information.

12. A real-time three-dimensional (3D) real environment reconstruction apparatus, the apparatus comprising:
a plurality of GPUs that process frame information acquired by a plurality of RGB-D cameras, each GPU being part of a set that includes one RGB-D camera and one GPU, each GPU including:
a feature extraction and matching unit that receives the frame information input from the RGB-D camera that is part of the set that includes the GPU, extracts feature point information from frame information of a present view point and frame information of a previous view point, and extracts matching points of feature points;
a local 3D information generation unit that generates local 3D coordinates of each of the matching points extracted from each of the view points by the feature extraction and matching unit;
a local 3D information transmission unit that transmits the local 3D coordinates generated by the local 3D information generation unit to a CPU; and
a feature point information transmission unit that transmits the feature point information extracted by the feature extraction and matching unit to the CPU; the CPU including:
a frame information transmission unit that transmits the frame information input from the RGB-D camera to the GPU in each set;
a local 3D information collection unit that collects local 3D coordinates from each of the GPUs;
a feature point information collection unit that collects feature point information from each of the GPUs; and
a global 3D information generation unit that generates global 3D coordinates by matching the local 3D coordinates using correction information of each of the RGB-D cameras and the feature point information.

* * * * *